(12) United States Patent
Fournier

(10) Patent No.: US 7,271,731 B2
(45) Date of Patent: Sep. 18, 2007

(54) VEHICLE DASHBOARD

(75) Inventor: Joël Fournier, Saint Christophe (FR)

(73) Assignee: Johnson Controls Automotive Electronics (FR)

( * ) Notice: Subject to any disclaimer, the term of this patent is extended or adjusted under 35 U.S.C. 154(b) by 106 days.

(21) Appl. No.: 10/479,186

(22) PCT Filed: May 28, 2002

(86) PCT No.: PCT/FR02/01798

§ 371 (c)(1),
(2), (4) Date: May 12, 2004

(87) PCT Pub. No.: WO02/096695

PCT Pub. Date: Dec. 5, 2002

(65) Prior Publication Data

US 2004/0189446 A1   Sep. 30, 2004

(30) Foreign Application Priority Data

May 28, 2001 (FR) .................................. 01 06927

(51) Int. Cl.
*G08B 5/00* (2006.01)
(52) U.S. Cl. ............................. 340/815.4; 340/815.47; 340/425.5; 180/90; 362/23
(58) Field of Classification Search ............ 340/815.4, 340/815.47, 425.5, 461, 995; 180/90; 362/23, 362/29, 600; 359/630, 631, 13, 14, 22, 23, 359/25
See application file for complete search history.

(56) References Cited

U.S. PATENT DOCUMENTS

| | | | | |
|---|---|---|---|---|
| 4,621,306 | A * | 11/1986 | Sell .............................. | 362/29 |
| 4,983,951 | A * | 1/1991 | Igarashi et al. ............. | 340/461 |
| 5,148,146 | A * | 9/1992 | Murphy ....................... | 340/461 |
| 6,049,288 | A * | 4/2000 | Kawasaki ................. | 340/815.4 |
| 6,603,393 | B2 * | 8/2003 | Sumada et al. .......... | 340/425.5 |
| 6,705,659 | B2 * | 3/2004 | Suzuki et al. ................. | 296/70 |

FOREIGN PATENT DOCUMENTS

| | | |
|---|---|---|
| EP | 0 177 134 A2 | 4/1986 |
| WO | 99/23624 A1 | 5/1999 |

* cited by examiner

*Primary Examiner*—Anh V. La
(74) *Attorney, Agent, or Firm*—Foley & Lardner LLP

(57) ABSTRACT

The instrument panel for a vehicle, comprises at least one liquid crystal display, which is characterized in that the display is of the positive transparent type, and in that its rear face, with respect to the position of the driver, is illuminated by daylight. In particular, it is mounted on the dashboard projecting therefrom, the rear face being illuminated by the light from the windshield of the vehicle. The instrument panel also comprises a device of illumination for use by night.

19 Claims, 1 Drawing Sheet

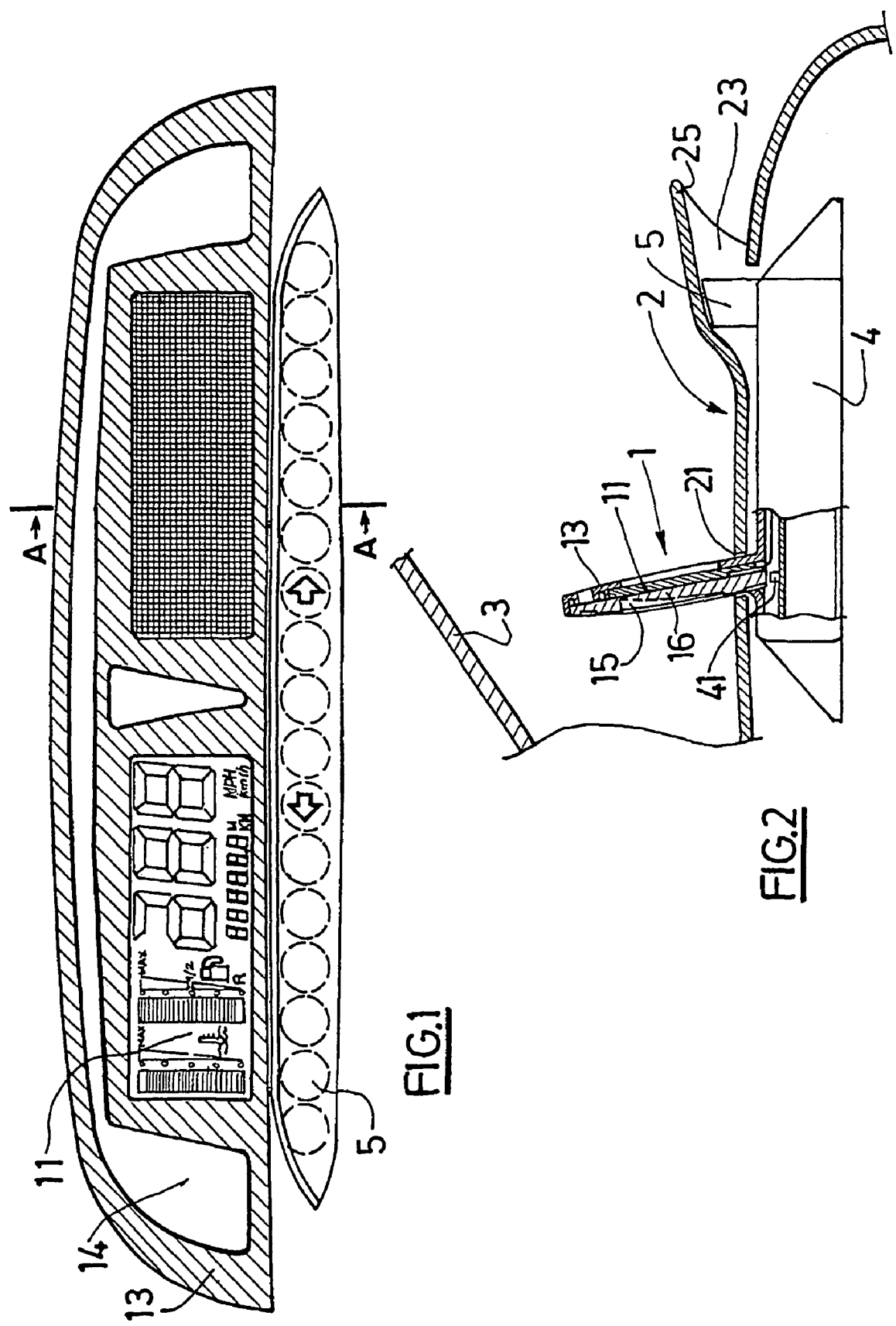

VEHICLE DASHBOARD

CROSS REFERENCE TO RELATED APPLICATIONS

This application is a National Stage of Application PCT/FR02/001798, filed May 28, 2002, which the claims priority to FR01/06927 filed May 28, 2001, the disclosures of which are incorporated herein by reference in their entirety.

FIELD

The invention relates to an instrument panel for a vehicle, particularly for a motor vehicle.

BACKGROUND

An instrument panel comprises a certain number of indicators: tachometer, gages, odometers or alternatively indicators indicating parameters regarding the status of the vehicle or the engine. This list is not exhaustive.

According to the prior art, the indicators usually involve pointers. They have movements for driving the pointers past screens marked with other indications on a front face of the support. All of this is located behind a nonreflective protective screen fixed to a covering case known as the flange.

This type of instrument panel occupies a certain amount of space. To solve this problem, the applicant company has already, in its French patent application published under No. 2 779 682, proposed a solution for a flat instrument panel. This instrument panel has indicators with pointers arranged directly against the front face of the instrument panel, behind the latter. Thanks to this arrangement it is possible to produce a very flat instrument panel that can easily be sited inside the cabin. In particular, it can be taken out of the dashboard.

There now exist instrument panels the indicators of which are liquid crystal displays. Such displays are well known as is their use in the automotive field. These may be dot or matrix displays, of the monochrome or color type. The instrument panel is then embedded in the dashboard.

SUMMARY

The applicant company set itself the task of producing an instrument panel comprising at least one liquid crystal display and the structure of which was as light as possible.

It also set itself the task of producing an instrument panel the structure of which offered the possibility of creating novel esthetic forms.

Document EP A 177 134 discloses an instrument panel for a vehicle, comprising at least one liquid crystal display of the positive transparent type, its rear face, with respect to the driver's position, being illuminated by daylight. However, with this instrument panel, at night, a UV bulb is illuminated near the display, one of the walls of which is sensitive to UV light. By night, the screen is luminous, the figures becoming visible through opaqueness.

The applicant company has sought to further simplify such an instrument panel. It has achieved this using an instrument panel as claimed in claim 1.

According to a preferred embodiment, the instrument panel is mounted projecting from the dashboard and in such a way that its rear face with respect to the driver is illuminated by ambient light. In particular, the rear face is illuminated by the light from the windshield. This type of display, thanks to its slenderness and its transparency, makes it possible to produce an instrument panel that is particularly light, visually unobtrusive, and offers a novel surround for the creation of esthetic shapes.

According to another feature, the display device is associated with a light guide allowing the indicators to be made visible by night or when the ambient lighting, particularly external lighting, is insufficient. This light guide preferably takes the form of a sheet of transparent plastic such as PMMA, which is an abbreviation for polymethyl methacrylate acrylonitrile. The sheet is then placed against the rear face of the display device, the surround of which also acts as a support for it. Part of its rear face is curved toward the display so that the light emitted by an external light source and arranged laterally with respect to the display is at least partially reflected in its direction. This curved part is preferably covered with a reflective means. The latter is chosen so as not to form a barrier to the light coming in from behind the sheet. Advantageously, a translucent white marking is used.

Other features will become apparent from reading the description which follows of one embodiment of the invention, with reference to the attached drawings in which:

BRIEF DESCRIPTION OF THE DRAWINGS

FIG. 1 is a front view of the instrument panel according to the invention,

FIG. 2 is a view in section on AA of the instrument panel of FIG. 1.

DESCRIPTION OF THE EXEMPLARY EMBODIMENTS

FIG. 2 depicts schematically and in part section the instrument panel (1), the outline of the dashboard (2) on which it is mounted, and part of the windshield (3) of the vehicle. The steering wheel is on the right with respect to the figure; it is not depicted. The instrument panel (1) is a thin component, in this instance flat, emerging from an opening (21) made in the dashboard (2). In this embodiment, the instrument panel is secured to a housing (4) housed inside the dashboard and comprising the instrument panel control means in particular. To the right of the housing with respect to the figure there are indicator lamps (5), for example flashing ones, that cannot be displayed on the liquid crystal display means. The driver sees the lamps through an opening (23). This opening is surmounted by a hood (25) providing protection against any stray light.

The instrument panel comprises a surround (13) with a first housing for a liquid crystal display device (11). The surround is manufactured, for example, in a plastic of which the face seen on the driver's side is preferably black and grained. The surround is arranged so that it projects with respect to the dashboard, that is to say that it makes a significant angle therewith. The device (11) can be seen through suitable openings formed in the surround (13).

The device (11) is of the liquid crystal display type known per se. It comprises various information zones. For example, as can be seen in FIG. 1 and the left-hand part of the instrument panel, this may be the tachometer, the odometer, the fuel gage and the radiator water temperature gage.

It is of the positive transparent type. In order for the information appearing in the indicated zones to be visible with sufficient contrast, steps are taken to ensure that its rear face, the face facing away from the driver, is sufficiently illuminated. The rear face receives external light directly from the windshield (3) of the vehicle. For that to happen, it needs to be far enough clear of the dashboard.

The instrument panel comprises a sheet (15) forming a support for the display (11), which is pressed against the rear face of the latter and is fixed to the surround (13) in a second housing. The plastic of the sheet is translucent. It may preferably be PMMA but any other material that satisfactorily transmits light to the rear face of the display is also suitable.

In this embodiment, the support (15) is flat. It thus acts as a light guide for light originating from some source other than ambient light. For this purpose on its outer face it comprises a surface portion (16) curved toward information zones of the display device (11) and treated so as to reflect light. In the embodiment depicted, the sheet (15) has been hollowed out in its part facing the information zones of the display. The closed end of the hollowed-out part has the desired convex curved shape. A light source (41) is placed at the base of the sheet (15) in the casing (4). An LED is suited to this use. When the diode is powered, it illuminates the surface portion (16) through the sheet. The light is thus reflected partly toward the display. In order to improve the diffusion of light, diffusing white marking is provided. Any other equivalent treatment is appropriate provided of course that it does not form a mask against the light coming from the windshield. Black marking (17) is also provided on the zones that do not face the display, so as to avoid stray illumination.

The instrument panel works as follows. During the day, the light from the windshield is sufficient to illuminate the display. When the external light dims, the driver switches on the instrument panel illumination switch and the light emitted by the LED takes over.

The invention claimed is:

1. An instrument panel for a vehicle, comprising:
   at least one positive transparent type liquid crystal display comprising information zones and neutral zones;
   a transparent support backing up the display at least on the information zones, acting as a support of the display and as a light guide comprising a surface portion curved toward the display for reflecting the light originating from a light source placed outside the instrument panel, and wherein a rear face of the display, with respect to a position of a driver, is illuminated by daylight.

2. The instrument panel as claimed in claim 1, wherein the display is mounted on a dashboard projecting therefrom, the rear face being illuminated by light from a windshield of the vehicle.

3. The instrument panel as claimed in claim 1, wherein the display comprises a means for illuminating the display by night.

4. The instrument panel as claimed in claim 3 wherein the illuminating means further comprises the light source placed outside the instrument panel laterally with respect to the display.

5. The instrument panel as claimed in claim 1, wherein the surface portion is treated with a reflective means.

6. The instrument panel as claimed in claim 5, wherein the surface portion of the rear face of the transparent support that does not face the information zones of the display is treated with black.

7. The instrument panel as claimed in claim 1, wherein the display is mounted in a surround of which the surface in the driver's sight is of a dark color.

8. An instrument panel for a vehicle, comprising
   at least one positive transparent type liquid crystal display comprising information zones and neutral zones, the display being backed up against a transparent sheet acting as a light guide illuminated by illuminating means for illuminating the display and acting as the support of the display;
   wherein the instrument panel is flat, thin, and emerges from an opening made in the dashboard of the vehicle and projects from the dashboard such that a rear face of the display is illuminated by ambient light and by the illuminating means through the transparent support.

9. The instrument panel of claim 8, wherein the instrument panel is secured to a housing housed inside the dashboard.

10. The instrument panel of claim 9, wherein the illuminating means is in the housing.

11. The instrument panel of claim 10, wherein a control means of the instrument panel is located in the housing.

12. The instrument panel of claim 9, wherein a control circuit of the instrument panel is located in the housing.

13. The instrument panel of claim 8, wherein an outer face of the transparent support comprises a surface portion curved towards the display for reflecting light originating from the illuminating means.

14. The instrument panel of claim 13, wherein the surface portion is treated with a reflective means which does not form a mask against the light coming from the windshield.

15. The instrument panel of claim 13, wherein a surface portion that does not face the information zones is treated with black.

16. The instrument panel of claim 8, wherein the illuminating means comprise at least one LED.

17. An instrument panel for a vehicle, comprising
   at least one positive transparent type liquid crystal display comprising information zones and neutral zones;
   a light source, light from the light source being usable to illuminate the display; and
   a transparent sheet backing up the display, the sheet acting as a light guide illuminated by the light source; wherein the transparent sheet supports the display allowing it to be illuminated by ambient daylight from the windshield of the vehicle;
   wherein the instrument panel projects from the dashboard such that a rear face of the display is illuminated by ambient light; and
   wherein the instrument panel is connected to a housing located inside the dashboard.

18. The instrument panel of claim 17, wherein a control circuit configured to control the instrument panel is located in the housing.

19. The instrument panel of claim 17, wherein the outer face of the support comprises a surface portion curved towards the display for reflecting light originating from the light source.

* * * * *